E. L. McDONALD.
METHOD OF AND APPARATUS FOR MAKING ELECTRICAL MEASUREMENTS.
APPLICATION FILED JULY 5, 1916.

1,306,069.

Patented June 10, 1919.

Witness:
C. E. Burnap

Inventor:
Ervan L. McDonald
By Sheridan, Wilkinson & Scott, Attys

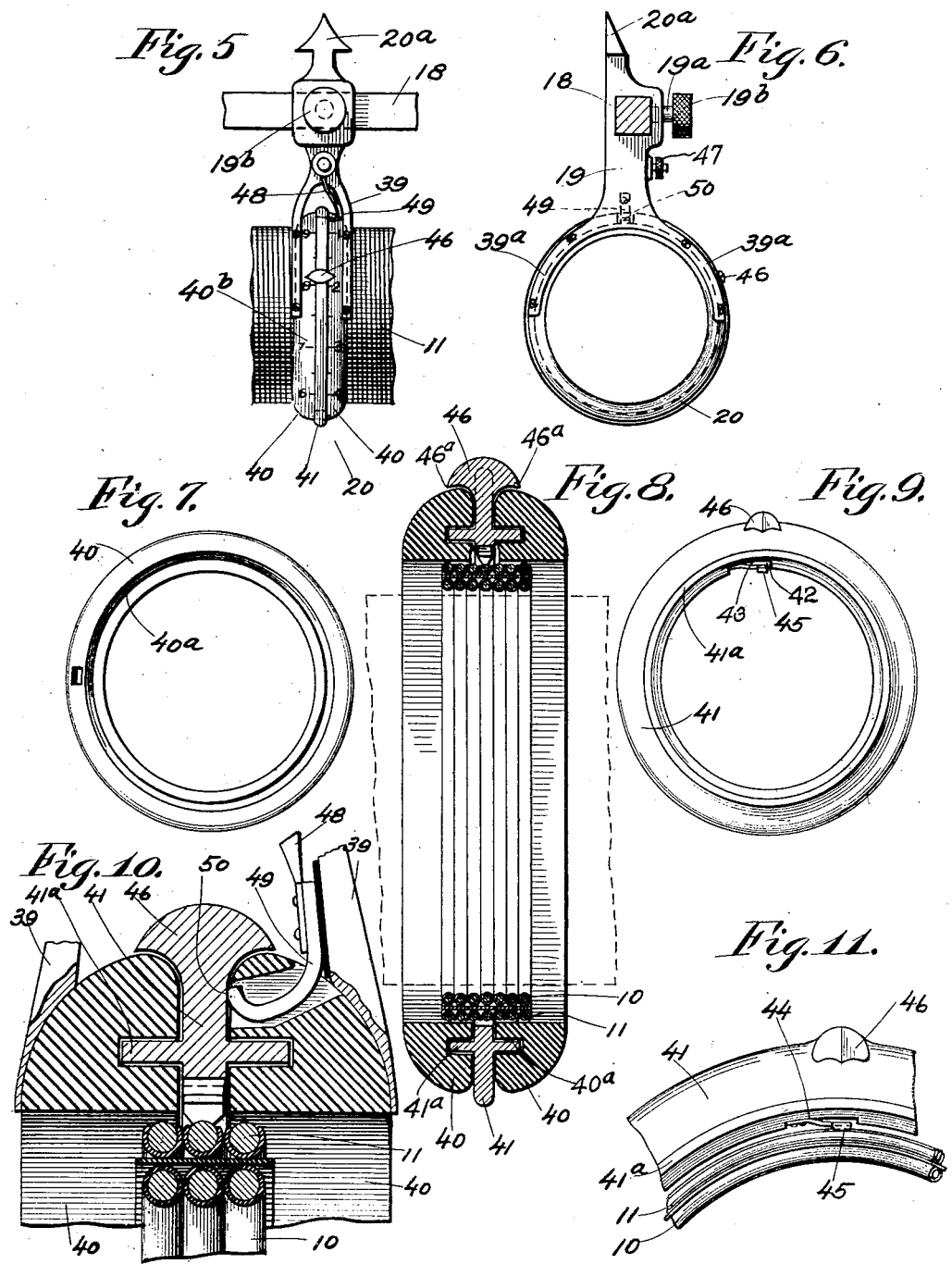

UNITED STATES PATENT OFFICE.

ERVAN L. McDONALD, OF SALT LAKE CITY, UTAH.

METHOD OF AND APPARATUS FOR MAKING ELECTRICAL MEASUREMENTS.

1,306,069. Specification of Letters Patent. Patented June 10, 1919.

Continuation in part of application Serial No. 837,317, filed May 8, 1914. This application filed July 5, 1916.
Serial No. 107,706.

*To all whom it may concern:*

Be it known that I, ERVAN L. McDONALD, a citizen of the United States, residing at Salt Lake City, in the county of Salt Lake and State of Utah, have invented certain new and useful Improvements in Methods of and Apparatus for Making Electrical Measurements, of which the following is a specification.

My invention relates to apparatus for making electrical measurements, and has for its object to provide a simple and improved method of and apparatus for measuring or comparing various characteristics of electrical elements. For instance, this invention may be used among other purposes for measuring the electrical resistance, the electrical capacity, or the inductance of an electrical conductor; for measuring the magnetic reluctance of magnetic metals; for comparing alternating or pulsating electromotive forces of the same frequency, but of different pressures; and for measuring various other characteristics of electric circuits and other electrical elements.

The present application is a continuation of my prior co-pending application, Serial No. 837,317, filed May 8, 1914, as to all common subject matter.

As is well known to those skilled in the art, electrical measurements such as those referred to above require rather complicated, delicate, and expensive apparatus of a different form for the measurement of each different characteristic of the electrical element, the use of which consumes a vast amount of time and involves elaborate computations.

The principal object of my invention is to provide an apparatus comprising a small number of parts which will be simple, durable, and inexpensive to construct, and which will be capable of being speedily operated to perform with accuracy any of the above-named or other measurements. A further advantage of the use of my improved method and apparatus is that the necessary calculations are greatly simplified.

Other objects, characteristics, and advantages of my invention will be set forth and made apparent in the following specification, of which the accompanying drawings form a part.

In the drawings—

Fig. 5 is a detail plan view of a contact member, showing a portion of the coil with which said member makes contact.

Fig. 6 shows a side elevation of the contact member and other apparatus shown in Fig. 5.

Fig. 7 shows a somewhat enlarged side elevation of one of the insulating rings of the contact member.

Fig. 8 shows a sectional view through the contact member and inductive coils, showing the insulating rings and conducting ring in assembled relation.

Fig. 9 shows a somewhat enlarged side elevation of the rotating conducting ring of the contact member.

Fig. 10 shows an enlarged horizontal sectional view through a portion of the coils and the contact member, with the conducting ring in a different position than in Figs. 5 and 6; and Fig. 11 is an enlarged partial side elevation of the conducting ring, showing the means for making contact with a turn of the outer coil.

Figure 2:
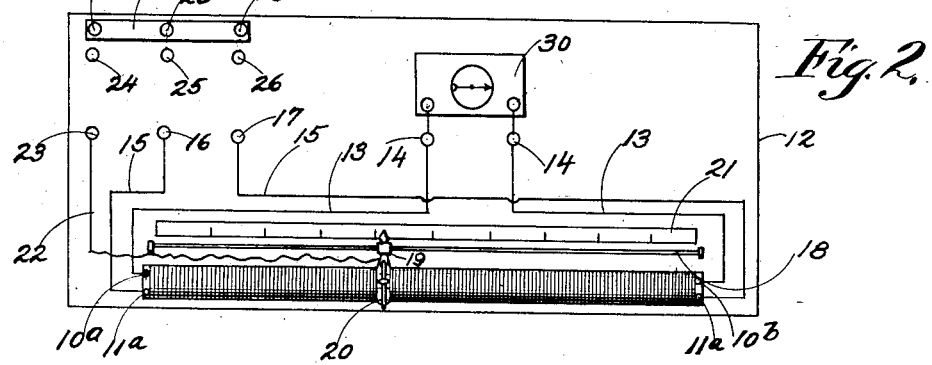
Fig. 2 is a plan view of my apparatus assembled in permanent form on a base plate, the connections for actual operation not being shown.

Like numerals refer to like parts and elements in the several figures of the drawings, in which my invention is shown as comprising two electrical conducting coils 10 and 11, which are inductively wound on the same core. The core may be an air core, or formed of nonmagnetic or magnetic materials, as hereinafter described, the core being represented by dotted lines in Fig. 8 of the drawings. Each inductive coil is made up of a plurality of turns, which are insulated from each other and from the turns of the other coil, the outer coil 11 being wound concentrically with the coil 10 and in close proximity thereto, being preferably separated therefrom by one or more sheets of insulating material. The two coils are of equal length, preferably made up in sleeve-like form, with the turns of one coil symmetrically located with respect to the turns of the adjacent coil. The two coils, formed preferably with an equal number of turns of the same sized wire in each coil, are arranged so that the current flowing in a turn of one coil will cause a current to be induced in the concentrically located turn of the other coil, and both of the coils are mounted on a base plate 12 of insulating material, as shown in Fig. 2. The terminals 10$^a$ and 10$^b$ of the coil 10 are connected by means of the electrical conductors 13 to the binding posts 14, which are permanently fixed on the base plate 12. The terminals 11$^a$ and 11$^b$ of the coil 11 are connected by means of the electrical conductors 15 to the binding posts 16 and 17, which are also permanently secured to the base plate. A portion of the peripheral surface of the coil 11 is uninsulated, so that each of the turns of said coil is exposed on the outer periphery thereof, in order that an electrical contact can be made with said coil at any point between its ends. A guide rod 18, preferably of rectangular cross section, is mounted upon the base plate parallel to the coils 10 and 11, and has slidably mounted thereon a member 19, which carries the contact member 20 adapted to make an electrical connection with the exposed portions of the turns of the coil 11 at any point between the ends of said coil. A graduated scale 21 is secured to the base plate parallel to the guide rod, and a pointer 20$^a$, carried by the sliding member 19, is adapted to project over the graduations on this scale. The electrical conductor 22 connects the sliding and contact members with a binding post 23, which is secured to the base plate adjacent the binding posts 16 and 17. Opposite the binding posts 23, 16, and 17 are the respective binding posts 24, 25, and 26, which are also secured to the base plate. A common connecting plate 27, of conducting material, is secured to the base plate adjacent the last-named binding posts, and has fixed thereon, and in electrical connection therewith, the binding posts 37, 28, and 29. By means of the binding posts 14 the inner inductive coil 10 can be connected in circuit with a detector 30, which may be a galvanometer, a telephone receiver, or other detector of feeble currents.

In order to insure greater accuracy in the adjustment of the apparatus a contact member 20, of special form is provided. The outwardly extending portion of the sliding member 19 which carries the contact member 20 is bifurcated, as shown clearly in Fig. 6, to form two forked arms 39, each of which is provided with an arcuate flange 39$^a$ having an inner surface adapted to conform to a portion of the outer contour of the insulating ring 40. Each of these insulating rings is concentric with and has an inner diameter slightly greater than the outer diameter of the coil 11, and is secured to its corresponding arcuate flange 39$^a$ by suitable screws, or other fastening means. The inner plane faces of the rings 40, which are then spaced apart, serve as guides or bearings for a rotatable conducting ring 41, which carries means for making electrical contact with a single turn of the coil 11 at any point around the periphery thereof after the sliding member 19 has been moved to the desired position longitudinally of the coil. The conducting ring 41 has an inner diameter greater than the inner diameter of the rings 40, and is provided on each side with a concentric annular flange 41$^a$, which is journaled in a corresponding annular groove 40$^a$ in the adjacent insulating ring 40. The ring is thus maintained in proper relation to the coil 11, and is prevented from forming an electrical contact therewith, except as hereinafter described.

The ring 41 is provided at some point on the inner side thereof with a notch 42 having an arcuate surface 43, upon which is mounted a spring connector 44, whose head 45 is adapted to make contact with the outer surface of the turn of the coil 11. As shown in Figs. 8 and 10, the head 45 has a surface conforming to the contour of the conductor of the coil, so that said head will maintain contact under the influence of its spring with a single turn of the coil 11 upon rotation of the ring 41. The head 45 is also beveled at each side of its contacting surface, so that it will readily slide over successive turns of the coil as the entire contact member 20 is moved longitudinally of the coil on the guide rod 18. Radially outward of the head 45, the ring 41 carries a relatively fixed pointer 46, having diametrically opposite points 46$^a$ which project over the graduations 40$^b$ on the insulating rings 40, as shown in Fig. 5.

The sliding member 19 carries a binding post 47 adapted to form an electrical connection with the conductor 22 leading from the binding post 23. The binding post 47 is preferably insulated from the member 19, and is provided with an insulated conductor 48, by means of which an electrical connection is made between the conductor 22 and a spring contact 49, which is secured to, but preferably insulated from, an arm 39 of the member 19 and adapted to project into a slot in one of the rings 40 to make contact with the rings 41, as shown at 50. Since the operator of the apparatus moves the contact member longitudinally of the coil 11 by means of the sliding member 19, the binding post 47 and associated parts are preferably insulated therefrom, as stated, in order that said member will form no part of the electrical circuit. This member 19 is threadedly engaged by a stud 19ª, which may be operated by means of a knurled head 19ᵇ to engage the guide rod 18, and thereby secure the contact member 20 in any desired position longitudinally of the coil 11.

It will be apparent that by means of the contact member 20 of the form just described an electrical connection is made between the conductor 22 and a single turn of the coil 11 at any point around the periphery thereof. A ring 41 being properly graduated to indicate the decimal points of the coil 11, the operator may from the positions of the pointers 20ª and 46 determine the number of turns and fractional parts thereof which are included in each turn of the coil 11 at each side of the point where an electrical contact is made therewith by the contact member 20. The rings 40 may be graduated to read in opposite directions, and two points 46ª provided, so that the fractional part of a turn included in each portion of the coil 11 at corresponding sides of the contact member 20 may be read directly, or the graduations may be placed on the ring 41 and the indicators attached to the rings 40. In order to facilitate reading of the position of the pointer 46 when it is on the under side of the coil 11, a mirror or other suitable means may be adopted to indicate the reading to the operator in his position above the coil.

Figure 1:
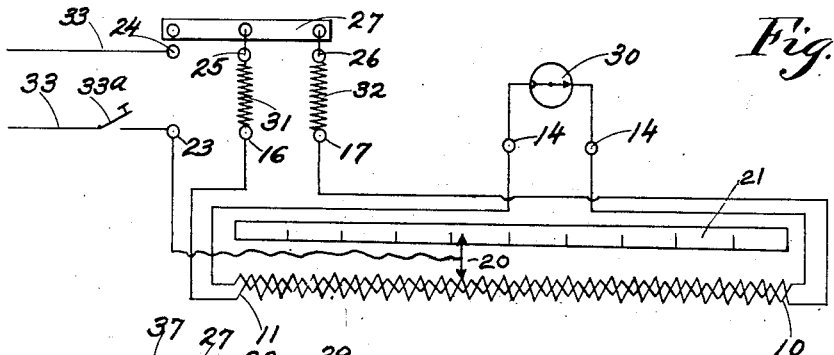
Figure 1 is a diagrammatic view of the general arrangement and connections of my apparatus, showing the uniform and symmetrical arrangement of the turns of the inductive coils.

I have above described the parts of my apparatus which I prefer to assemble in permanent form on the base plate or standard, so that the apparatus may be conveniently moved from one position to another to be at all times in readiness for operation. Referring to Fig. 1, I have have shown diagrammatically the connections of my apparatus which are used for measuring or comparing the resistances of electrical conductors. The two resistances 31 and 32, which are to be compared, are connected between the respective pairs of binding posts 25 and 16 and 26 and 17, the binding posts 25 and 26 being connected to the common connecting plate 27, or to the ground, as preferred. The electrical conductors 33, leading from a source of alternating current E. M. F., or other suitable supply, are connected to the binding posts 23 and 24, a switch 33ª being inserted in one of the lines, if desired, for convenience in opening and closing the circuit. Thus it will be seen that one terminal of the source of electric pressure is connected to the sliding contact member 20. The other terminal of this source of pressure is connected to the common connecting plate 27, or to the ground in case the binding posts 25 and 26 have been connected to the ground. Referring to Figs. 1 and 2, it will be apparent that two parallel electric circuits are formed between the contact member 20 and the connecting plate 27, as follows: The circuit 20, 11ª, 16, 31, 25, and 27, and the circuit 20, 11ᵇ, 17, 32, 26 and 27.

It is therefore apparent that the current entering the coil 11 from the contact member 20 will at any given instant be flowing in opposite directions from the contact member in the two portions of the coil 11 at each side thereof. The inductive action of one portion of the coil will therefore be opposed to that of the other portion, so that when those two actions are unequal a current will flow in the coil 10 and cause a deflection or indication of the galvanometer or other detector 30. When the inductive action of the two portions of the coil 11 on corresponding portions of the coil 10 just neutralize each other there will be no flow of current in the circuit of the coil 10, and no deflection or indication of the galvanometer, telephone receiver, or other deflector.

Having connected the apparatus as above described, the sliding member 19 is adjusted longitudinally of the coil 11, and the contact member 20 manipulated until the inductive effect of one of the above-named branch circuits just balances that of the other branch circuit. In making this adjustment the contact member 20 is moved longitudinally of the coil until a point is reached where the detector 30 indicates an approximate balance. The ring 41 is then adjusted within the insulating rings 40 until an exact balance is found. When this point of balance is reached the current induced in coil 10 will be zero, owing to the fact that the inductive effect of the two portions of the coil 11 on each side of the contact member will just neutralize each other, with the result that the voltages induced in corresponding proportional parts of the coil 10 will neutralize each other. Thus the point of balance will be indicated by the galvanometer or other detector 30, which will fail to register when this point in the adjustment has been reached. The scale 21 being graduated according to the number of turns in the coil 11, the relative number of turns and fractional parts thereof in the two portions of said coil at each side of the contact made by the contact member 20 can readily be determined by reading the indications made by the pointers 20ª and 46 on their corresponding scales. When the point of balance is reached, the ampere-turns in the two parts of the coil 11 on each side of the point of contact are equal, and the currents flowing in the two branch circuits are inversely proportional to the resistances in the respective branches, since the resistance of the conductors and the coil is negligible.

Since the numbers of turns in the two parts of the coil 11 are inversely proportional to the currents flowing in those parts, it follows that the values of the resistances 31 and 32 will then be directly proportional to the number of turns in the two portions of the coil 11 at each side of the contact member, and if one of the resistances 31 or 32 be a known or standard resistance, the value of the other may be readily calculated from the proportion which the number of turns in the two portions of the coil bear to each other, all of which will be readily understood by anyone skilled in the art to which this invention appertains.

In measuring capacities, inductances, magnetic reluctances, or the like, the principle of operation of my apparatus is the same, the only difference being that different standards are substituted between the binding posts 25 and 16 and 26 and 17. For instance, if the electrical element connected between the binding posts 26 and 17 be one whose capacity is unknown, a standard capacity is connected between the binding posts 25 and 16, and the adjustment of the contact member is made as before until a point of balance is reached, as indicated by the galvanometer or detector 30. The scales 21 and 40$^b$ are then read, and the calculations for determining the unknown capacity are made by the method of proportions, the readings of the scale being inversely proportional to the capacities of the electrical elements in the corresponding branches of the circuit.

If it be desired to determine the inductance of any electrical element, a coil whose inductance is known is connected between the binding posts 25 and 16, for example, and the other unknown inductance is connected between the binding posts 26 and 17, and the sliding contact member adjusted until a point of balance is reached. When making inductance measurements with my apparatus it is desirable that the standard and unknown inductances have substantially the same ohmic resistance, so that the only factor affecting the balance of the instrument is the difference in the inductive action of the two circuits.

To measure the magnetic reluctance of magnetic materials, two inductively wound coils of the same dimensions and number of turns each are connected between the pairs of binding posts 25 and 16 and 26 and 17. A magnetic core of known reluctance is then inserted in one of these coils, and a similar core of the material whose reluctance is unknown is inserted in the other coil. The movable contact member is then adjusted, and when a point of balance is reached the reluctance of the unknown magnetic material can be calculated from that of the magnetic material of known reluctance after determining the ratio of the number of turns of the coil 11 on each side of the contact member.

I preferably wind the coils 10 and 11 upon a core of non-magnetic material, but a core of magnetic material may be used if desired, since I have found in practice that accurate results may be obtained with a magnetic core. The accuracy of the results is increased by constructing the coils of my apparatus with a relatively low resistance. The speed with which the apparatus may be used may be augmented by graduating the scale 21 to read in both directions, and this also provides a quick and convenient means for checking results by reversing the position of the two elements under test.

Figure 3:
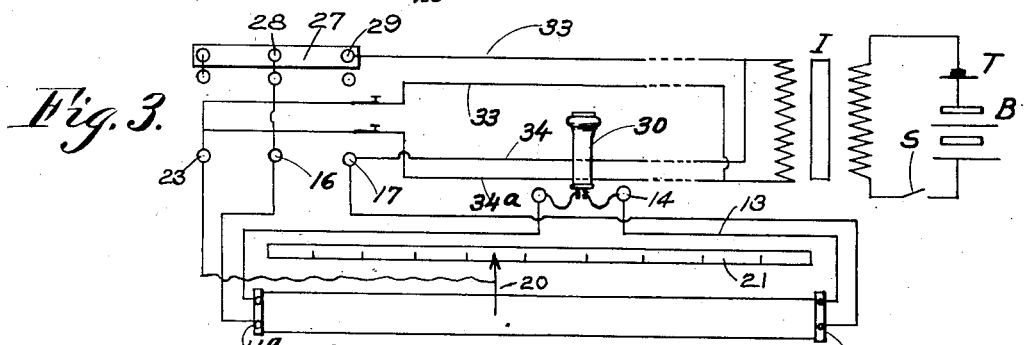
Fig. 3 shows diagrammatically the connections of my apparatus for comparing alternating or pulsating currents or electromotive forces and for comparing the characteristics of electric circuits.

In Fig. 3 I have shown the connections of my apparatus for comparing two alternating or other electromotive forces of the same frequency, but of different pressures, or for comparing the impedances or other characteristics of two circuits. In this case the terminal 33 from one source of electric pressure is connected to the binding post 23 as before, the other terminal 33 being connected through the binding post 16 to one end of the coil 11. One terminal 34$^a$ of like polarity of the other E. M. F. to be compared is also connected to the binding post 23, the other terminal 34 of the last-named source of pressure being connected through the binding post 17 to the other terminal of the coil 11. The connections having been made so that the inductive effect of one portion of the coil 11 is opposed to that of the other portion, the sliding contact member 20 is then adjusted until the point of balance is reached. The relation of the two electromotive forces, or the currents flowing, will then be inversely proportional to the number of turns of the coil 11 traversed by their respective currents. An example of this use of the apparatus is the measurement of the impedances or comparison of the transmission efficiencies of telephone or other transmission lines. For instance, the two circuits 33—33 and 34—34$^a$ may be telephone lines, the distant ends of which are connected to an induction coil I, or other device, giving a constant or known alternating current, and including in its local circuit the transmitter T, battery B, and switch S. After a balance of the inductive coils 10 and 11 has been effected, the readings of the scales will show the relative losses of current in the two lines due to the effects of inductance, resistance, capacity, and insulation losses; that is, the readings will show the relative transmission efficiencies of the two lines under comparison. If one circuit only, such as the circuit 34—34$^a$, is connected to the apparatus, the inducing current flows through one portion only of the coil 11, and the apparatus may be used in this manner for measuring the received current, provided the instrument has been previously calibrated. The calibration may be made by sending a small known current through a portion of the coil 11, and determining the point where the inductive effect just fails to produce a sound in the telephone receiver 30. Having determined this point for one current, corresponding points may be calculated for other currents, since the ampere-turns would be the same in each case. In the operation of the apparatus the contact member is adjusted until the current just fails to produce a sound in the telephone receiver, and the current received over the single line 34—34ª may then be determined from the calibration table. If the current or voltage impressed on the line at the transmitting end is known, the losses due to the different characteristics of the line may be calculated. When using the apparatus for telephone measurements, or for other measurements where the currents flowing are very weak, a telephone receiver is preferably used as a detector, since it is more sensitive to very small currents.

Figure 4:
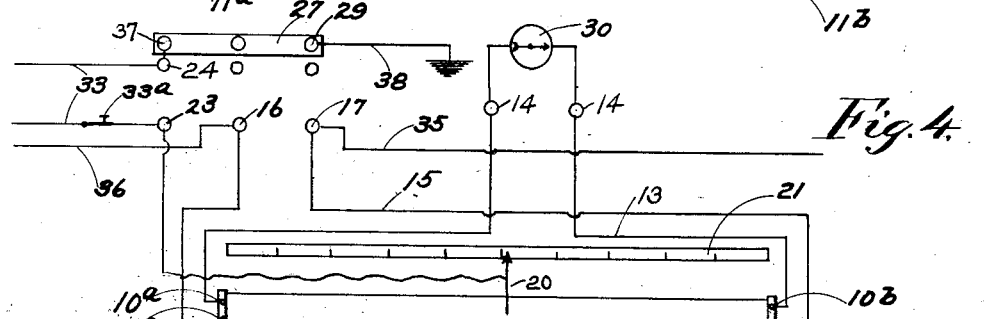
Fig. 4 shows diagrammatically the connections of my apparatus for locating "breaks" in an electric circuit.

In Fig. 4 I have illustrated diagrammatically a commercial adaptation of my apparatus in locating "breaks" or "opens" in telegraph, telephone, or other electrical lines. In case of a metallic circuit the two wires are considered as condensers, the earth forming one plate of each condenser and being connected to the common plate 27 by the conductor 38, as shown. One wire 35 of the circuit is connected to the binding post 17, and the other wire 36 is connected to the binding post 16. The conductors 33, leading from a source of alternating or other suitable electric pressure, are connected to the binding posts 23 and 24, as in Fig. 1, the binding post 24 being connected to the binding post 37 on the plate 27.

The connections having been made as described, it will be seen that the effect is the same as having two condensers connected between the binding posts 16 and 17 and the plate 27. If the wires are the same size and material, and the length of one is known, the length of the other can be determined very accurately, as will be apparent to one skilled in the art. In case of a single wire the electrical capacity per mile must be known and the test made by comparison with a known standard of capacity.

In the operation of my device the direction in which the contact member should be moved to secure a balance may be determined by trial, the proper direction of movement being such as will cause the deflection or indication of the detector to decrease. For instance, when using a galvanometer as a detector, such as a D'Arsonval galvanometer, which I preferably employ when using the device with intermittent or pulsating current, the deflection of the galvanometer will decrease in amplitude as the point of balance is approached, and will increase in amplitude when the contact member is moved away from the point of balance. When the point of balance has been located as accurately as possible by a bodily movement of the contact member, the movable ring of the contact member is rotated until an exact balance is obtained. In some instances it may be desirable during the process of adjustment to open the primary circuit at intervals, in order to permit the movable element of the detector to come to rest. For ordinary measurements, such as those of resistance, capacity, and inductance substantially any form of galvanometer may be used with any form of inducing current if the currents are not too weak; but when using a galvanometer as a detector I prefer one in which the movement thereof is slightly, but not too heavily, "damped". The adjustment is similar with other detectors which operate in a similar manner. When a telephone receiver is used as a detector, which instrument I prefer when extreme sensitiveness is desired, and especially when using the device with alternating current, or very weak currents, the proper direction of movement of the contact member to secure a balance will be indicated by a decrease in vibration of the diaphragm of the receiver. The point of balance will be indicated by an absence of sound in the receiver.

From the foregoing description, taken in connection with the drawings, it will be apparent that I have provided a novel and convenient means for measuring the various characteristics of electrical elements by the use of a single apparatus. It will of course be understood that certain details of my apparatus may be modified without departing from the spirit of my invention. For instance, it may be desirable in certain cases to make the connections directly to the earth, instead of employing the common contacting plate 27, the use of which I have found to be advantageous.

The construction of the coils and the movable contact connected thereto is described and claimed in my co-pending application, Serial No. 837,317, filed May 8, 1914.

I have explained my invention in connection with one particular form and arrangement of apparatus, but it will be obvious that it may be embodied in other forms of apparatus which may be operated upon the principles which have been set forth herein in connection with the particular form of apparatus described, and I do not therefore wish to be limited to the particular form and arrangement of apparatus herein described. It will be understood that I contemplate changes in form and arrangement, and the substitution of equivalents, without departing from the spirit of my invention as defined in the appended claims.

I claim:

1. The method of comparing the characteristics of electrical elements by connecting said elements in parallel branches of a fluctuating current circuit, each of said elements being in series with a variable portion of a single inductive coil, and varying the number of turns in said portions until the inductive effect of one branch circuit balances that of the other branch circuit.

2. The method of comparing the characteristics of electrical elements by connecting said elements in parallel branches of a fluctuating current circuit, each of said elements being in series with a variable portion of a single inductive coil, and varying the number of turns in said portions until the inductive effect of one branch circuit balances that of the other branch circuit as indicated by a detector connected in circuit with a second inductive coil arranged adjacent said first-named coil.

3. The method of comparing the characteristics of electrical elements which consists in passing suitable currents through each of them and through respective inductances in series therewith, varying said inductances until their inducing effects in a secondary circuit are balanced, and then determining the ratio which one of said inductances bears to the other.

4. The method of comparing the characteristics of electrical elements which consists in connecting said elements each in series with a part of an inductive coil, passing suitable currents through each element and the corresponding parts of said coil with the inductive effects of said parts opposed to each other, varying said parts of said coil until the inductive effect of one part neutralizes that of the other part, and then determining the ratio of said parts.

5. The method of comparing the characteristics of electrical elements which consists in connecting said elements in parallel branches of a fluctuating current circuit, each of said elements being in series with a variable portion of a single inductive coil, varying the number of turns in said portions until the inductive effect of one branch circuit neutralizes that of the other branch circuit as indicated by a detector connected in circuit with a second inductive coil arranged adjacent said first-named coil, and then determining the ratio of the turns in the two branches of said first-named circuit.

6. The method of comparing the characteristics of electrical elements which consists in connecting said elements in parallel branches of a suitable electrical circuit with each element in series with an inductance, varying said inductances until the inductive effect of one branch circuit balances that of the other branch circuit in a secondary circuit adjacent thereto, and then determining the ratio which the inductance in one branch circuit bears to the inductance in the other branch circuit.

7. The method of comparing the characteristics of electrical elements which consists in connecting said elements in parallel branches of a suitable electrical circuit with each element in series with an inductance, varying said inductances until the inductive effect of one branch circuit balances that of the other branch circuit in a secondary circuit adjacent thereto, then determining the ratio which the inductance in one branch circuit bears to the inductance in the other branch circuit, and then determining from said ratio the desired characteristics of the elements compared.

8. The method of comparing the characteristics of electrical elements which consists in connecting one terminal of each of said elements in series with an inducing element, connecting the other terminals of said first-named elements to one terminal of a suitable source of supply, connecting an intermediate point of said inducing element with the other terminal of said source of supply, then varying the intermediate point of connection of said inducing element until the effects of the portions of said inducing element on each side of said intermediate point neutralize each other in a secondary circuit comprising a suitable electrical element placed adjacent said inducing electrical element, and then determining the relative portions of said inducing element on each side of said intermediate point.

9. The method of comparing the characteristics of electrical elements, which consists in connecting each of said elements in series circuit with a variable inductance, impressing equal voltage on each of said circuits, varying said inductances until their opposing inductive effects balance each other in a secondary circuit containing inductive elements adapted to have voltages induced therein by the currents passing through said inductances.

10. In an apparatus for making electrical measurements, an inductive coil having its terminals arranged to be connected to a galvanometer or other detector, a second inductive coil arranged adjacent said first-named coil, and a movable member adapted to contact electrically with said last-named coil intermediate its ends and to be connected to one terminal of a source of alternating electrical pressure, the terminals of said last-named coil being arranged to be connected to the respective terminals of the electrical elements to be compared and which elements are connected at their other terminals to the other terminal of said source of alternating electrical pressure.

11. In an apparatus for making electrical measurements, two inductive coils adjacent to and insulated from each other, one of said coils being arranged to be connected to the terminals of a galvanometer or other detector, the other coil having a portion of the outer surface of its turns uninsulated to form an electrical connection with a movable contact member which is connected in an electrical circuit, the terminals of said last named coil being arranged to be connected in parallel branches of said circuit, each branch having connected therein one of the electrical elements to be compared.

12. In apparatus of the class described, a pair of inductive coils of equal length wound uniformly and concentrically one within the other, the outer coil being adapted to be connected in circuit with the elements to be tested, said circuit connections comprising a contact member adapted to contact with any desired turn of said coil between its ends, and a detector connected with the inner coil in a secondary circuit.

13. In apparatus of the class described, a pair of inductive coils of the same length and same number of turns each wound symmetrically in sleeve-form one within the other, the outer coil having its turns partly uninsulated, means for making electrical connections with said coils, and a contact member movable longitudinally of said coils to make contact with said outer coil at various points between its ends.

14. In apparatus for comparing electrical elements, a primary circuit comprising two parallel branches each including an inducing element in series with one of the elements to be compared, means for varying the inductive effect of said inducing elements, and a secondary circuit comprising a detector and members in which voltages may be induced by said inducing elements.

15. An apparatus for comparing the characteristics of electrical elements comprising a primary circuit adapted to have connected therein the elements to be compared, an inductive coil included in said circuit with a variable part thereof in series with each of said elements, the two elements being compared and the two parts of said coil being in parallel branches of said circuit, means to vary the number of turns in each branch, and means for determining the relative portions of said coil in each of said branches.

16. An apparatus for comparing the characteristics of electrical elements comprising a primary circuit adapted to have connected therein the elements to be compared, an inductive coil included in said circuit with a variable part thereof in series with each of said elements, the two elements being compared and the two parts of said coil being in parallel branches of said circuit, means for varying simultaneously and oppositely the number of turns in each branch, means for determining the relative portions of said coil in each of said branches, and means to indicate when the inductive effect of one part of said coil neutralizes that of the other part.

17. In apparatus of the class described, a pair of relatively immovable inductive coils located within the influence of each other and each connected in a separate circuit, one of said circuits being adapted to be connected to a suitable source of supply, and means to vary the effect of the coil in said last-named circuit until no induced current flows in the other circuit.

18. In apparatus of the class described, a pair of inductive coils located within the influence of each other and connected in separate circuits, one of said circuits being adapted to be connected to a suitable source of supply, the coil in said last-mentioned circuit comprising two parts whose inductive effects are opposed, and means to vary the relative number of turns in said parts until the inductive effects of said parts in the corresponding parts of said other coil neutralize each other.

19. In apparatus for comparing the characteristics of electrical elements, a pair of inducing elements each adapted to be connected in series with one of said elements to be compared, means for impressing equal voltages on each of said series circuits, means for varying said inductances, means for indicating when the inductive effects of said inducing elements in a secondary circuit are equal, and means for determining the ratio of value of said inductances.

In testimony whereof I have subscribed my name.

ERVAN L. McDONALD.

Witnesses:
MRS. VILATE FROMPTON,
R. N. COOPER.